United States Patent
Brumley et al.

(10) Patent No.: US 9,065,632 B2
(45) Date of Patent: Jun. 23, 2015

(54) MESSAGE AUTHENTICATION USING A UNIVERSAL HASH FUNCTION COMPUTED WITH CARRYLESS MULTIPLICATION

(71) Applicant: QUALCOMM Incorporated, San Diego, CA (US)

(72) Inventors: Billy B. Brumley, San Diego, CA (US); Alexander W. Dent, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/771,531

(22) Filed: Feb. 20, 2013

(65) Prior Publication Data

US 2014/0237237 A1     Aug. 21, 2014

(51) Int. Cl.
| | |
|---|---|
| *H04L 9/32* | (2006.01) |
| *H04L 9/06* | (2006.01) |
| *H04L 29/06* | (2006.01) |
| *H04W 12/10* | (2009.01) |
| *H04W 88/02* | (2009.01) |

(52) U.S. Cl.
CPC .............. *H04L 9/0643* (2013.01); *H04L 9/065* (2013.01); *H04L 9/3242* (2013.01); *H04L 63/123* (2013.01); *H04W 12/10* (2013.01); *H04L 2209/80* (2013.01); *H04W 88/02* (2013.01)

(58) Field of Classification Search
CPC ..... H04L 9/0643; H04L 9/065; H04L 9/3242; H04L 63/123; H04W 12/10
USPC .......................... 713/168–170; 380/28, 37, 44
See application file for complete search history.

(56) References Cited

U.S. PATENT DOCUMENTS

| | | | | |
|---|---|---|---|---|
| 4,538,240 | A * | 8/1985 | Carter et al. .................. | 708/492 |
| 7,933,905 | B2 * | 4/2011 | Obana et al. .................. | 707/747 |
| 8,732,853 | B1 * | 5/2014 | Byrne et al. .................... | 726/28 |
| 2005/0188218 | A1 * | 8/2005 | Walmsley et al. ............ | 713/200 |
| 2006/0159260 | A1 * | 7/2006 | Pereira et al. ................. | 380/44 |
| 2006/0282743 | A1 * | 12/2006 | Kounavis ...................... | 714/758 |
| 2008/0270793 | A1 * | 10/2008 | Nowottnick .................. | 713/168 |
| 2009/0138710 | A1 * | 5/2009 | Minematsu ................... | 713/170 |
| 2009/0310775 | A1 | 12/2009 | Gueron et al. | |
| 2010/0111296 | A1 | 5/2010 | Brown et al. | |
| 2011/0044454 | A1 * | 2/2011 | Baek et al. .................... | 380/273 |
| 2012/0144161 | A1 | 6/2012 | Elliott | |
| 2013/0145169 | A1 * | 6/2013 | Poovendran et al. ......... | 713/181 |

OTHER PUBLICATIONS

3GPP, Specification of 3GPP Confidentiality and Integrity Algorithms, Dec. 2011, pp. 1-16.*
Satoh, High-Speed Hardware Architectures for Authenticated Encryption Mode GCM, 2006, IEEE, pp. 4831-4834.*
Halevi et al, MMH:Software Message Authentication in the Gbit/Second Rates, 1997, pp. 172-189.*
Crenne et al, Efficient Key-Dependent Message Authentication in Reconfigurable Hardware, 2011, IEEE, pp. 1-6.*

(Continued)

*Primary Examiner* — Christopher Brown
*Assistant Examiner* — Jenise Jackson
(74) *Attorney, Agent, or Firm* — Austin Rapp & Hardman (57) ABSTRACT

A method for authenticating a message by a wireless device is described. The wireless device obtains the input message. The wireless device generates a keystream. The wireless device computes a message authentication code using the keystream and a universal hash function. The universal hash function is computed using carryless multiplication.

39 Claims, 9 Drawing Sheets

(56) References Cited

OTHER PUBLICATIONS

Nguyen et al, Short-Output Universal Hash Functions and their Use in Fast and Secure Data Authentication, 2012, Oxford University, pp. 1-16.*
Krovertz, UMAC: Message Authentication Code using Universal Hashing, Mar. 2006, Network Working Group, pp. 1-19.*
Anderson, Carryless Multiplication Optimization for AES, GCM Mode, Nov. 18, 2010, Oracle Solaris, pp. 1-4.*
Lemire et al, Strongly Universal String Hashing is Fast, 2012, University of New Brunswick, pp. 1-15.*
Nguyen et al, On the Construction of Digest Functions for Manual Authentication Protocols, 2011, IACR Crytpology Eprint Archive, pp. 1-24.*
Apavatjrut et al, Energy Friendly Integrity for Network Coding in Wireless Sensor Networks, IEEE, 2010, pp. 223-230.*
Yu-Kuen et al, Stream-Based Implementation Hash Functions for Multi-Gigabit Message Authentication Codes, IEEE, 2006, pp. 1-6.*
Nguyen L.H., et al., "Short-output Universal Hash Functions and Their Use in Fast and Secure Message Authentication," Fast Software Encryption Lecture Notes in Computer Science, 2012, vol. 7549, pp. 326-345.
Wang Y., et al., "A Unified Signed-Digit Adder for High-Radix Modular Exponentiation on GF(p) and GF(2p)," ISIC 2009, pp. 687-690.
Aoki K., et al., "The Security and Performance of GCM when Short Multiplications Are Used Instead," Nov. 28, 2012, Information Security and Cryptology, Springer Berlin Heidelberg, Berlin, Heidelberg, pp. 225-245, XP047028051, ISBN: 978-3-642-38518-6.
Avanzi R., et al., "Faster 128-EEA3 and 128-EIA3 Software," International Association for Cryptologic Research, vol. 20130703:081706, Jul. 2, 2013, pp. 1-15, XP061007894.
ETSI/SAGE: "Specification of the 3GPP Confidentiality and Integrity Algorithms 128-EEA3 & 128-EIA3", 3GPP Draft; EEA3_EIA3 Specification_V1_7, 3rd Generation Partnership Project (3GPP), Mobile Competence Centre; 659, Route Deslucioles; F-96921 Sophia-Antipolis Cedex; France, Jan. 11, 2012, XP050577348, pp. 1-16.
International Search Report and Written Opinion—PCT/US2014/016285—ISA/EPO—Apr. 16, 2014.
Nguyen L.H., et al., "On the construction of digest functions for manual authentication protocols", International Association for Cryptologic Research, vol. 20120404:154833, Mar. 8, 2011, pp. 1-24, XP061004718.

* cited by examiner

MESSAGE AUTHENTICATION USING A UNIVERSAL HASH FUNCTION COMPUTED WITH CARRYLESS MULTIPLICATION

TECHNICAL FIELD

The present disclosure relates generally to wireless communication systems. More specifically, the present disclosure relates to systems and methods for message authentication using a universal hash function with carryless multiplication.

BACKGROUND

Wireless communication systems are widely deployed to provide various types of communication content such as voice, video, data and so on. These systems may be multiple-access systems capable of supporting simultaneous communication of multiple mobile devices with one or more base stations.

To provide additional security to wireless communications, encryption techniques may be used. Encryption is the process of encoding messages to prevent eavesdroppers/hackers from reading the messages and/or altering the message. Only an authorized party may decode the encrypted messages using a decryption algorithm. Even with encryption/decryption techniques, other techniques may be needed to protect the integrity and authenticity of a message. Benefits may be realized by improved methods for authenticating encrypted messages.

DETAILED DESCRIPTION

Message authentication may be used in wireless communications to provide integrity and authenticity assurances for a message transmitted wirelessly. This message authentication may include generating a message authentication code (MAC) using a universal hash function. The universal hash function acts as a key (in a keystream) to authenticate the input message. However, such authentication may require a significant number of machine instructions. By using carryless multiplication to compute the universal hash function, the number of machine instructions required may be greatly reduced, resulting in more efficient operations. This may in turn improve the throughput of the integrity algorithm. In addition, computing the universal hash function using carryless multiplication may be executed in wall clock time that is independent of the message bit values.

In the following description, for reasons of conciseness and clarity, terminology associated with the LTE standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few Likewise, a base station can sometimes be called an access point, a Node B, an evolved Node B, and so forth. It here should be noted that different terminologies apply to different technologies when applicable.

Figure 1:
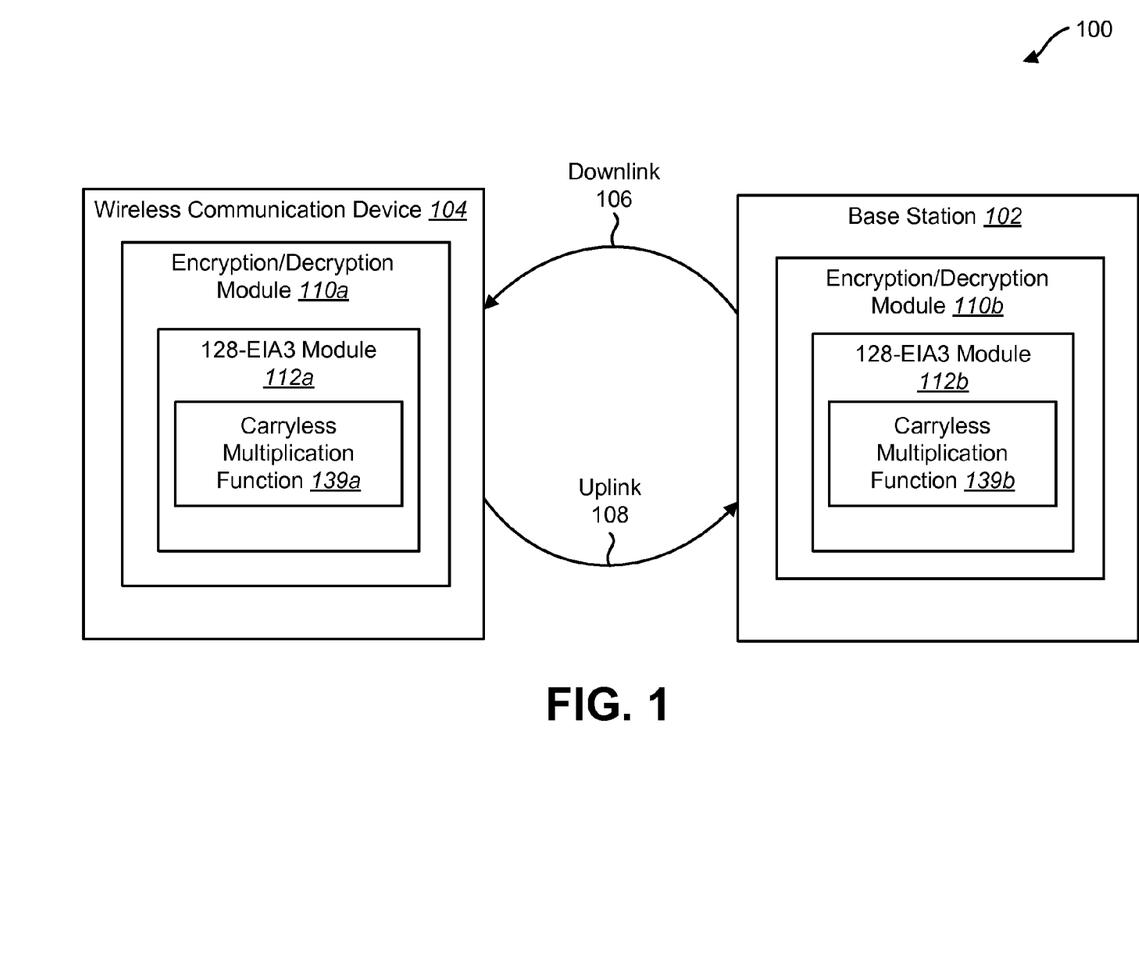
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a wireless communication device 104. Both the base station 102 and the wireless communication device 104 may be configured to authenticate encrypted messages (e.g., to provide authentication to transmitted messages and to obtain authentication for received messages). During authentication, a universal hash function may be computed using carryless multiplication. Computing the universal hash function using carryless multiplication is discussed in additional detail below in relation to FIG. 5 and FIG. 6.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

Both the wireless communication device 104 and the base station 102 may include an encryption/decryption module 110*a-b*. An encryption/decryption module 110 may allow for encryption and decryption of messages sent wirelessly between the wireless communication device 104 and the base station 102. For example, the encryption/decryption module 110*a* may allow the wireless communication device 104 to encrypt a message. The encrypted message may then be transmitted via the uplink 108 to the base station 102. The base station 102 may use the encryption/decryption module 110*b* to decrypt the message.

When using encrypted messages, authentication procedures may be used to authenticate a message and to detect forgery. Authentication procedures may include inserting authentication into a message prior to transmission and verifying the authentication of received messages. An encryption/decryption module 110 may include a 128-EIA3 module 112*a-b*. The 128-EIA3 module 112 may perform authentication procedures for encrypted messages (e.g., inserting authentication prior to transmission and obtaining authentication for received messages) using carryless multiplication. Thus, the 128-EIA3 module 112 may use a universal hash function for the integrity algorithm that uses a carryless multiplication function 139*a-b*. The carryless multiplication function 139 is discussed in additional detail below in relation to FIG. 5 and FIG. 6.

Within the security architecture of the LTE system, there are standardized algorithms for confidentiality and integrity. Two sets of algorithms (128-EEA1/128-EIA1 and 128-EEA2/128-EIA2) have already been specified (in Specification of the 3GPP Confidentiality and Integrity Algorithms; Document 1: f8 and f9 specifications; (3GPP TS35.201 Release 6) and 3GPP System Architecture Evolution (SAE); Security architecture; (3GPP TS33.401 Release 9)). 128-EIA3 applies a third algorithm for integrity (i.e., authentication) based on a stream cipher (ZUC). The 128-EIA3 algorithm may compute a 32-bit message authentication code (MAC) of a given input message using an integrity key (IK). The core algorithms adopted by the message authentication code (MAC) are a universal hash and the stream cipher (ZUC). The 128-EIA3 algorithm thus computes the message authentication code (MAC) in software requiring one 32-bit exclusive OR (XOR) instruction per message bit.

Figure 2:
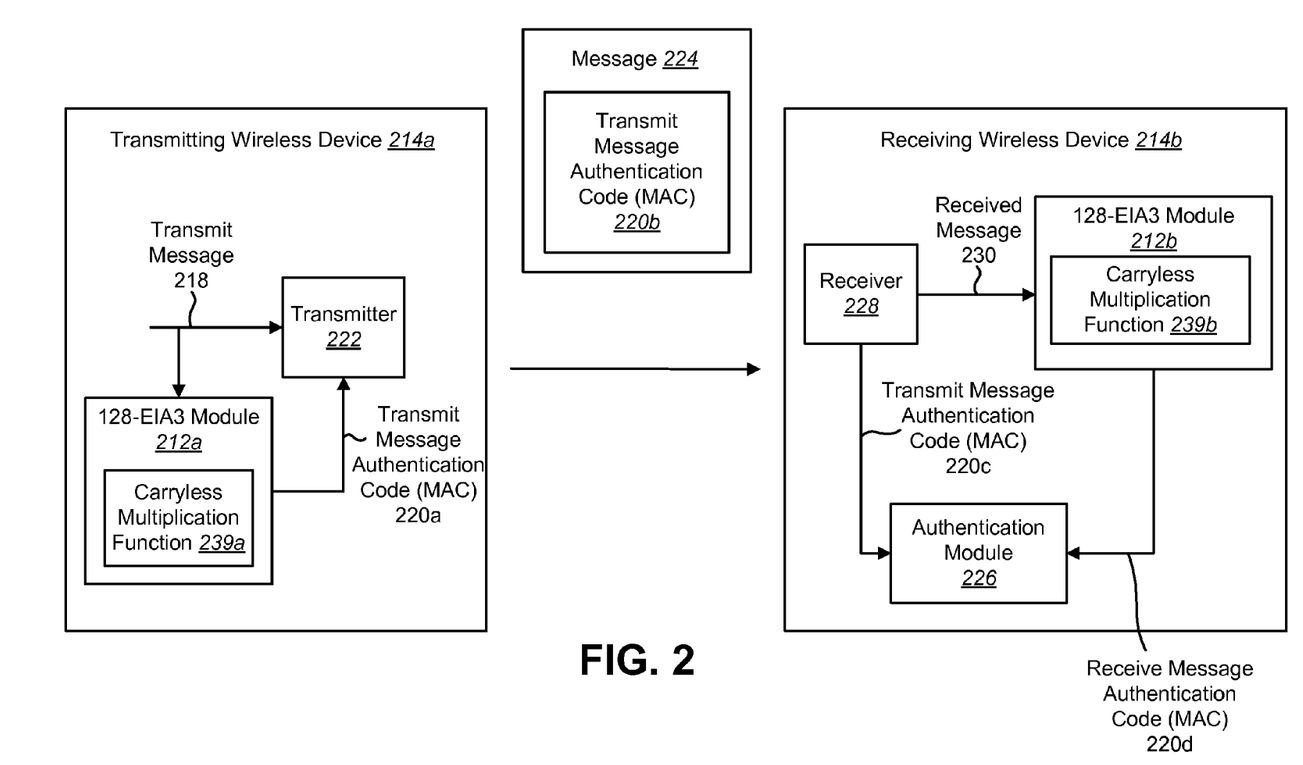
FIG. 2 is a block diagram illustrating authentication procedures between a transmitting wireless device and a receiving wireless device.

FIG. 2 is a block diagram illustrating authentication procedures between a transmitting wireless device 214*a* and a receiving wireless device 214*b*. The transmitting wireless device 214*a* may be either a wireless communication device 104 or a base station 102. The receiving wireless device 214*b* may be either a wireless communication device 104 or a base station 102. The authentication procedures in both the transmitting wireless device 214*a* and the receiving wireless device 214*b* may use the 128-EIA3 algorithm.

The transmitting wireless device 214*a* may obtain a transmit message 218 (i.e., by generating the transmit message 218). In one configuration, a processor on the transmitting wireless device 214*a* may generate the transmit message 218. The transmit message 218 may be provided to a 128-EIA3 module 212*a*. The 128-EIA3 module 212*a* may include a carryless multiplication function 239*a* (discussed below in relation to FIG. 5 and FIG. 7). Using the transmit message 218, the 128-EIA3 module 212*a* may output a transmit message authentication code (MAC) 220*a*. Both the transmit message 218 and the transmit message authentication code (MAC) 220*a* may be provided to a transmitter 222. The transmitter 222 may combine the transmit message 218 and the transmit message authentication code (MAC) 220*a* to obtain a message 224. The transmitter 222 may then transmit the message 224 (along with the transmit message authentication code (MAC) 220*b*).

The receiving wireless device 214*b* may obtain the message 224 (e.g., by receiving the message 224 using a receiver 228). In one configuration, the receiving wireless device 214*b* may obtain the message 224 using an antenna. The receiver 228 may extract the transmit message authentication code (MAC) 220c from the message 224. The receiver 228 may provide the transmit message authentication code (MAC) 220c to an authentication module 226. The receiver 228 may also provide the received message 230 to a 128-EIA3 module 212b. The 128-EIA3 module 212b may use the received message 230 to compute a receive message authentication code (MAC) 220d. The 128-EIA3 module 212b may include a carryless multiplication function 239b (discussed below in relation to FIG. 5 and FIG. 7). The 128-EIA3 module 212b may provide the receive message authentication code (MAC) 220d to the authentication module 226. The authentication module 226 may then compare the transmit message authentication code (MAC) 220c and the receive message authentication code (MAC) 220d to determine whether the message 224 received is authentic.

A message authentication code (MAC) algorithm (such as the 128-EIA3 algorithm) may also be referred to as a keyed (cryptographic) hash function. A message authentication code (MAC) algorithm may accept as input a secret key and an arbitrary-length message to be authenticated (e.g., the transmit message 218 or the received message 230) and output a message authentication code (MAC) 220 tag. Using a message authentication code (MAC) algorithm may protect both the data integrity and the authenticity of a message 224, since the receiving wireless device 214b can detect any changes to the message content (such as forgeries).

Figure 3:
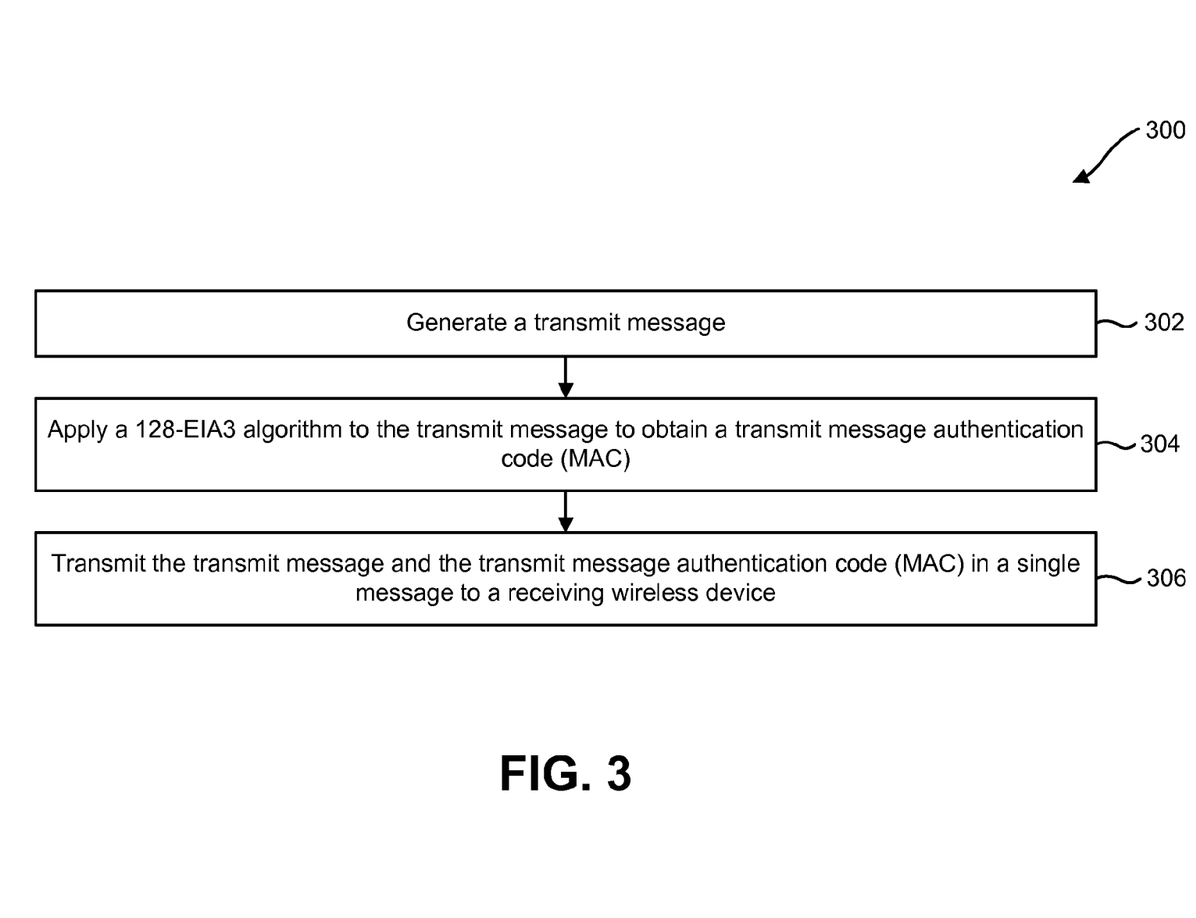
FIG. 3 is a flow diagram of a method for providing authentication to a transmit message.

FIG. 3 is a flow diagram of a method 300 for providing authentication to a transmit message 218. The method 300 may be performed by a transmitting wireless device 214a (such as a base station 102 or a wireless communication device 104). The transmitting wireless device 214a may generate 302a transmit message 218. The transmitting wireless device 214a may apply 304 a 128-EIA3 algorithm to the transmit message 218 to obtain a transmit message authentication code (MAC) 220a. The transmitting wireless device 214a may transmit 306 the transmit message 218 and the transmit message authentication code (MAC) 220a in a single message 224 to a receiving wireless device 214b.

Figure 4:
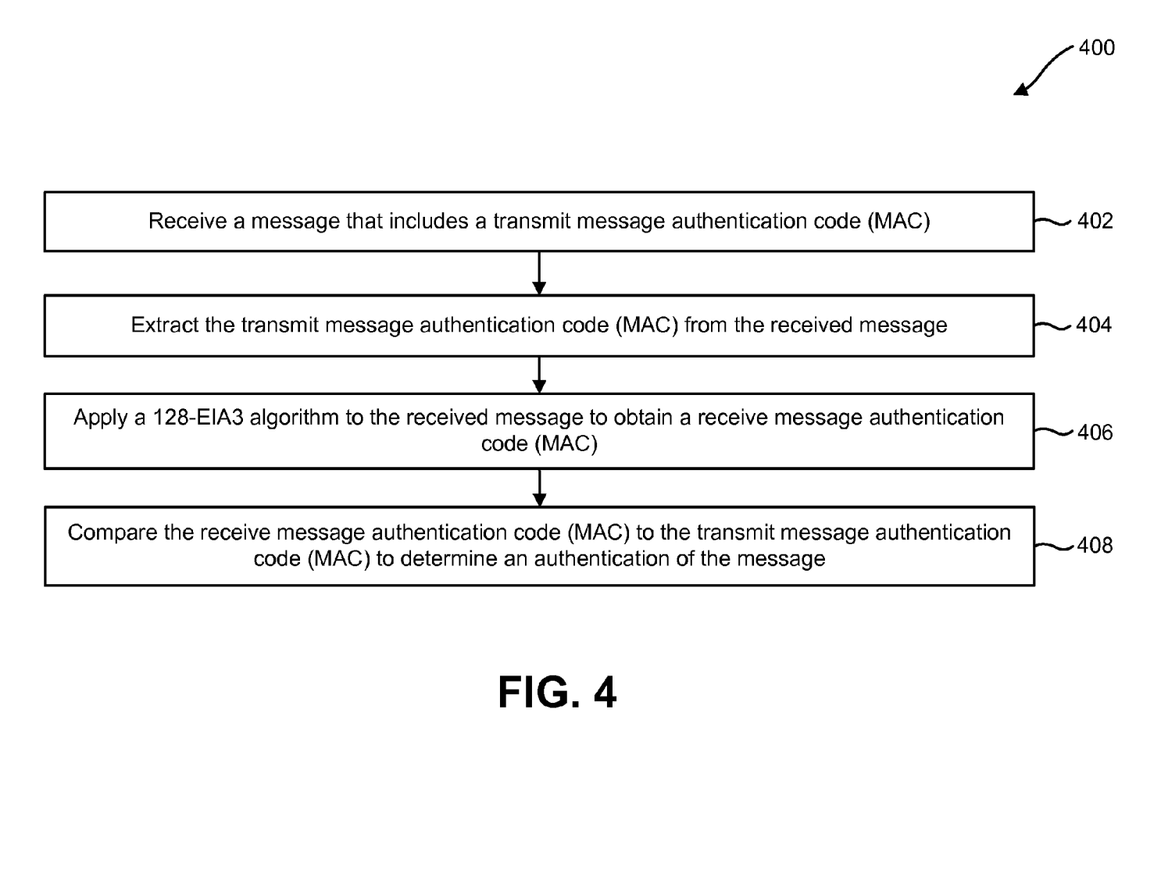
FIG. 4 is a flow diagram of a method for authenticating a received message.

FIG. 4 is a flow diagram of a method 400 for authenticating a received message 224. The method 400 may be performed by a receiving wireless device 214b (such as a base station 102 or a wireless communication device 104). The receiving wireless device 214b may receive 402 a message 224 that includes a transmit message authentication code (MAC) 220b. The receiving wireless device 214b may extract 404 the transmit message authentication code (MAC) 220c from the received message 224. The receiving wireless device 214b may apply 406 a 128-EIA3 algorithm to the received message 230 to obtain a receive message authentication code (MAC) 220d. The receiving wireless device 214b may compare 408 the receive message authentication code (MAC) 220d to the transmit message authentication code (MAC) 220c to determine an authentication of the message 224. For example, if the receive message authentication code (MAC) 220d is the same as the transmit message authentication code (MAC) 220c, the message 224 may be considered authentic. As another example, if the receive message authentication code (MAC) 220d is different from the transmit message authentication code (MAC) 220c, the message 224 may be considered inauthentic.

Figure 5:
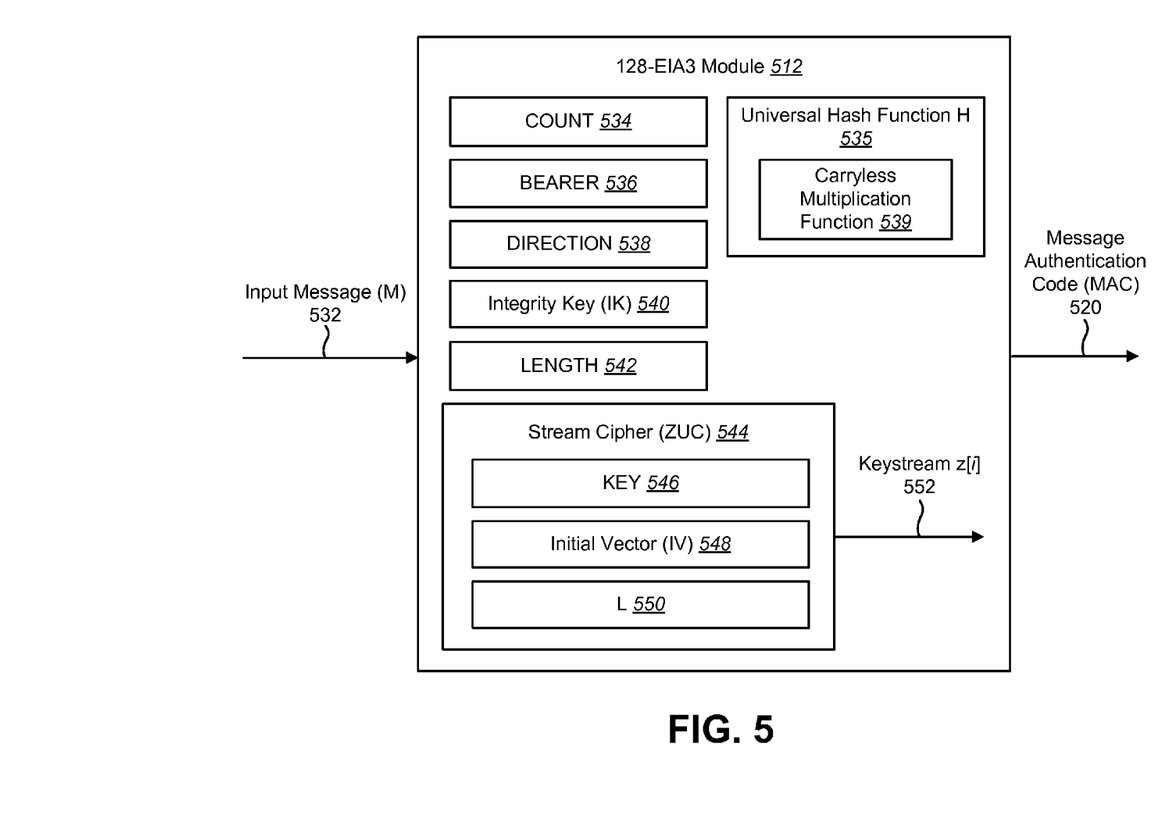
FIG. 5 is a block diagram illustrating a 128-EIA3 module for use in the present systems and methods.

FIG. 5 is a block diagram illustrating a 128-EIA3 module 512 for use in the present systems and methods. The 128-EIA3 module 512 of FIG. 5 may be one configuration of the 128-EIA3 modules 112a-b of FIG. 1. The 128-EIA3 module 512 may receive an input message (M) 532 and output a message authentication code (MAC) 520 that is computed using the input message (M) 532, a keystream 552, and a universal hash function H 535 that uses a carryless multiplication function 539. The keystream 552 may be computed using a stream cipher (ZUC) 544. The 128-EIA3 module 512 may thus apply a 128-EIA3 algorithm to the input message (M) 532 to obtain a message authentication code (MAC) 520 (and thus provide/obtain authentication for the input message (M) 532).

The 128-EIA3 module 512 may include a counter COUNT 534 that is 32-bits. The 128-EIA3 module 512 may also include a bearer identity BEARER 536 that is 5-bits. The 128-EIA3 module 512 may further include the direction of transmission DIRECTION 538, which is 1-bit. The 128-EIA3 module 512 may also include an integrity key (IK) 540 that is 128-bits. The LENGTH 542 of the input message (M) 532 may be 32-bits (i.e., the 32-bit LENGTH 542 may use 32-bits to indicate the length of the input message (M) 532). For example, the LENGTH 542 indicates the number of bits of the input message (M) 532 (between 1 and 65,504 bits). The message authentication code (MAC) 520 output by the 128-EIA3 module 512 may be 32-bits.

The 128-EIA3 module 512 may include a universal hash function H 535. The universal hash function H 535 refers to a subroutine in the 128-EIA3 algorithm that maps large data sets (i.e., the input message (M) 532) to smaller data sets of fixed length (i.e., the keystream 552). The universal hash function H 535 may be computed using a carryless multiplication function 539. The use of the carryless multiplication function 539 may allow the 128-EIA3 module to compute the universal hash function H 535 more efficiently.

The 128-EIA3 module 512 may also include a word-oriented stream cipher (ZUC) 544. The stream cipher (ZUC) 544 may take a 128-bit initial key (KEY) 546 and a 128-bit initial vector (IV) 548 as inputs and output a keystream z[i] 552 of 32-bit words (where each 32-bit word is called a key-word). The number of key-words generated by the stream cipher (ZUC) 544 may be defined by the variable L 550. The keystream 552 may be used for encryption/decryption. The computation of the message authentication code (MAC) 520 using the input message (M) 532 is discussed in additional detail below in relation to FIG. 6 and FIG. 7.

Figure 6:
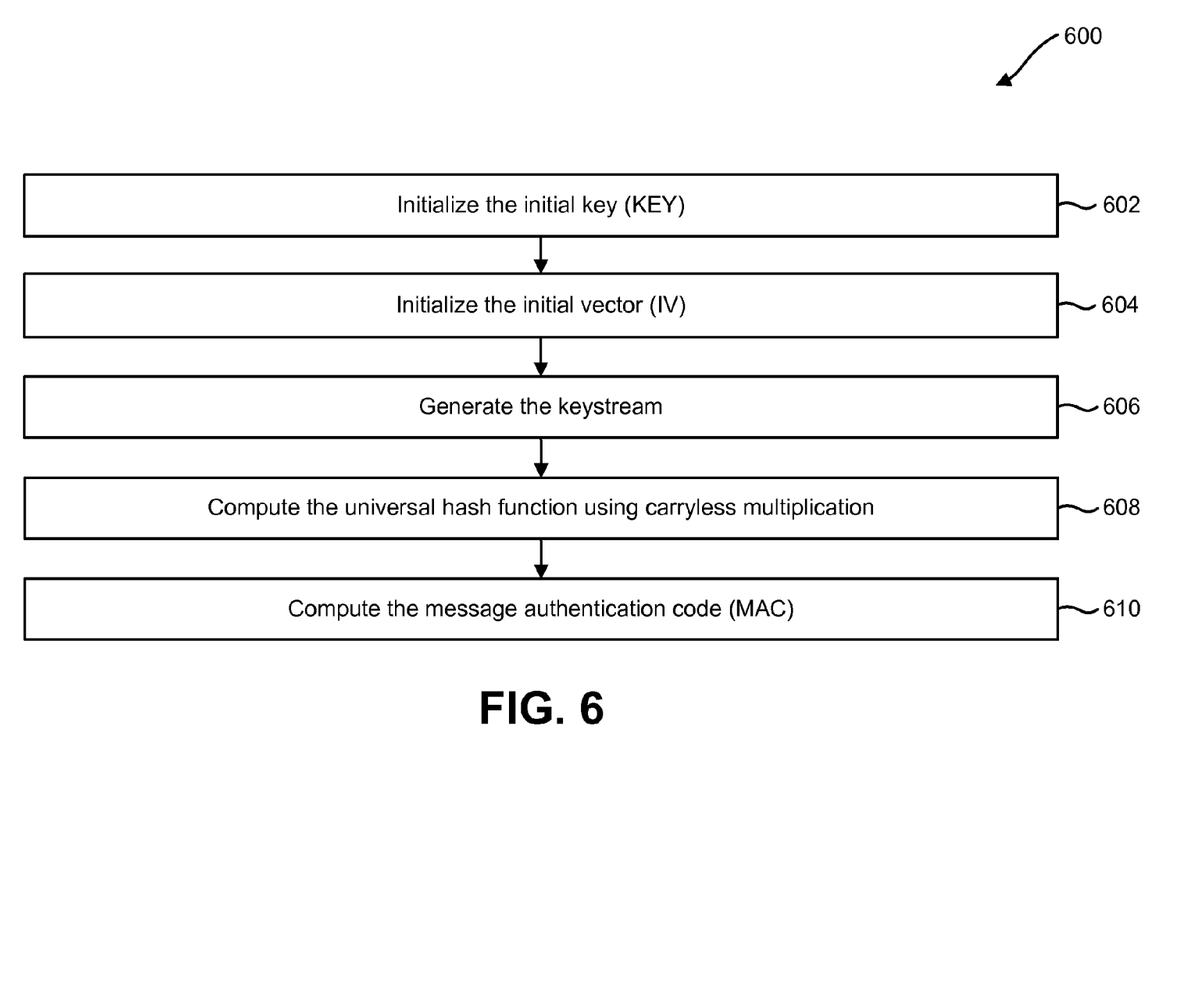
FIG. 6 is a flow diagram of a method for computing a message authentication code (MAC) using an input message (M)

FIG. 6 is a flow diagram of a method 600 for computing a message authentication code (MAC) 520 using an input message (M) 532. The method 600 may be performed by a 128-EIA3 module 512 on a wireless device 214 such as a base station 102 or a wireless communication device 104.

The wireless device 214 may initialize 602 the initial key (KEY) 546 and initialize 604 the initial vector (IV) 548 with the integrity key (IK) 540 and initialization variables before the generation of the keystream 552. When a variable is broken down into a number of substrings (as used in the equations below), the leftmost substring is [0], the next most significant substring is [1] and so on through to the least significant substring. The subscript 2 (e.g., $000_2$) is used to indicate a number in binary representation. The notation a∥b is used to indicate the concatenation of substrings a and b. The notation ⌈x⌉ refers to the smallest integer no less than x.

The 128-bit integrity key (IK) 540 may be defined using Equation (1):

$$IK=IK[0]\|IK[1]\|IK[2]\| \ldots \|IK[15].  \quad (1)$$

In Equation (1), IK[i] (0≤i≤15) are bytes. The 128-bit initial key (KEY) 546 to the stream cipher (ZUC) 544 may be set using Equation (2):

$$KEY=KEY[0]\|KEY[1]\|KEY[2]\| \ldots \mu KEY[15]  \quad (2)$$

In Equation (2), KEY[i] ($0 \leq i \leq 15$) are bytes. Thus, the initial key (KEY) 546 may be initialized 602 using Equation (3):

$$KEY[i]=IK[i], i=0,1,2,\ldots,15. \quad (3)$$

In Equation (3), each substring of the initial key (KEY) 546 is set equal to each corresponding substring of the integrity key (IK) 540. The 32-bit counter COUNT 534 may be defined using Equation (4):

$$COUNT=COUNT[0]\|COUNT[1]\|COUNT[2]\|COUNT[3]. \quad (4)$$

In Equation (4), COUNT [i], i=0,1,2,3 are bytes. The 128-bit initial vector (IV) 548 may be defined using Equation (5):

$$IV=IV[0]\|IV[1]\|IV[2]\|IV[15]. \quad (5)$$

In Equation (5), IV[i] ($0 \leq i \leq 15$) are bytes. The initial vector (IV) 548 may then be initialized 604 using Equation (6):

$$IV[0]=COUNT[0], IV[1]=COUNT[1],$$

$$IV[2]=COUNT[2], IV[3]=COUNT[3],$$

$$IV[4]=BEARER\|000_2, IV[5]=00000000_2,$$

$$IV[6]=00000000_2, IV[7]=00000000_2,$$

$$IV[8]=IV[0] \oplus (DIRECTION<<7), IV[9]=IV[1],$$

$$IV[10]=IV[2], IV[11]=IV[3],$$

$$IV[12]=IV[4], IV[13]=IV[5],$$

$$IV[14]=IV[6] \oplus (DIRECTION<<7), IV[15]=IV[7] \quad (6)$$

In Equation (6), $\oplus$ refers to an exclusive-OR operation and a<<t refers to a left shift of integer a by t bits. Thus, DIRECTION<<7 refers to shifting the DIRECTION 538 to the left 7 bits.

The wireless device 214 may then generate 606 the keystream 552. In one configuration, the keystream 552 may be generated by a processor on the wireless device 214. In another configuration, the keystream 552 may be generated using memory on the wireless device 214. The stream cipher (ZUC) 544 may generate a keystream 552 with L 550 keywords, where $$L = \left\lceil \frac{LENGTH}{32} \right\rceil + 2 \text{ words.}$$

The keystream 552 may be denoted by z[0], z[1], . . . , z[32×(L−1)], where z[0] is the most significant bit of the first output word of the stream cipher (ZUC) 544 and z[31] is the least significant bit. For each i=0,1,2, . . . , 32×(L−1), Equation (7) may be applied:

$$z_i = z[i]\|z[i+1]\|\ldots\|z[i+31]. \quad (7)$$

Thus, each $z_i$ of the keystream 552 is a 32-bit word. The wireless device 214 may then compute 608 the universal hash function prior to computing the message authentication code (MAC) 520. T may be defined as a 32-bit word. T may be initially set equal to 0. For each i=0,1,2, . . . , LENGTH−1, if M[i]=1 then Equation (8) is applied:

$$T = T \oplus z_i. \quad (8)$$

Equation (8) may be referred to as a universal hash function H. However, Equation (8) is tedious (since the computation of the universal hash function H must be performed for every single bit in the input message (M) 532). Instead, a carryless multiplication may be used to process 32-bits at a time of the input message (M) 532 to efficiently compute 608 the universal hash function H.

In carryless multiplication, polynomials are multiplied. One carryless multiplication iteration may replace 32 iterations of Equation (8). A carryless multiplication CLMUL(F, G) takes as input a 32-bit word F and a 32-bit word G and outputs a 64-bit word E, where the bits of F and G are taken as coefficients (of maximum degree 31) of polynomials in GF(2)[x] and where E is the resulting polynomial product (of maximum degree 62) in GF(2)[x]. This concept may apply to all carryless multiplication functions for any given word size wlog. For simplicity, it may be assumed that the word size wlog is an integer divisible by 32.

To compute the universal hash function H using carryless multiplication, the 32-bit word T may first be set to 0. A 32-bit word of the input message (M) 532 $M_i \ldots M_j$, where j=i+31, may be reversed according to Equation (9):

$$r0 = M_j \ldots M_i. \quad (9)$$

A first 64-bit word E may be found using Equation (10):

$$E = CLMUL(r0, Z\_i \ldots Z\_j). \quad (10)$$

In Equation (10), Z_i . . . Z_j refers to the bits of the keystream 552 and CLMUL refers to the carryless multiplication function, which is increasingly present on modern commodity processors. A second 64-bit word F may be found using Equation (11):

$$F = CLMUL(r0, Z\_k \ldots Z\_l). \quad (11)$$

In Equation (11), k=k+1 and l=k+31 (thus, the 32-bit word Z_k . . . Z_l immediately follows the 32-bit word Z_i . . . Z_j). The variable m may be set to the lowest 32-bit word of E. The variable n may be set to the highest 32-bit word of F. Equation (12) may then be performed:

$$r1 = m \oplus n. \quad (12)$$

The universal hash function is then computed 608 using Equation (13):

$$T = T \oplus r1. \quad (13)$$

The output message authentication code (MAC) 520 is then computed 610 according to Equation (14):

$$MAC = T \oplus z_{32(L-1)}. \quad (14)$$

The cost, in machine instructions, per 32 bits of the message may be fixed. In prior methods for the 1289-EIA3 specification, at least one instruction (i.e., a conditional XOR) is required per message bit. Thus, 32 instructions are required per 32 message bits. Using carryless multiplication to compute 608 the hash function requires 5 instructions per 32 message bits: one bit reversal of a word, two carryless multiplications and two XORs. Using carryless multiplication to compute 608 the universal hash function significantly reduces the number of machine instructions needed to evaluate the hash function H. This improves the throughput of the LTE integrity algorithm 128-EIA3. Furthermore, using carryless multiplication to compute 608 the universal hash function executes in wall clock time that is independent of the message bit values (the existing solution has a dependency on the message bit values, since Equation (8) is only applied when a message bit=1). Thus, using carryless multiplication to compute 608 the universal hash function may provide additional protection against a large array of side-channel attacks such as timing and power analysis attacks, thereby improving the physical security of the system. A wall clock execution time of carryless multiplication may be independent of the hamming weight of the operands, increasing side-channel security.

Figure 7:
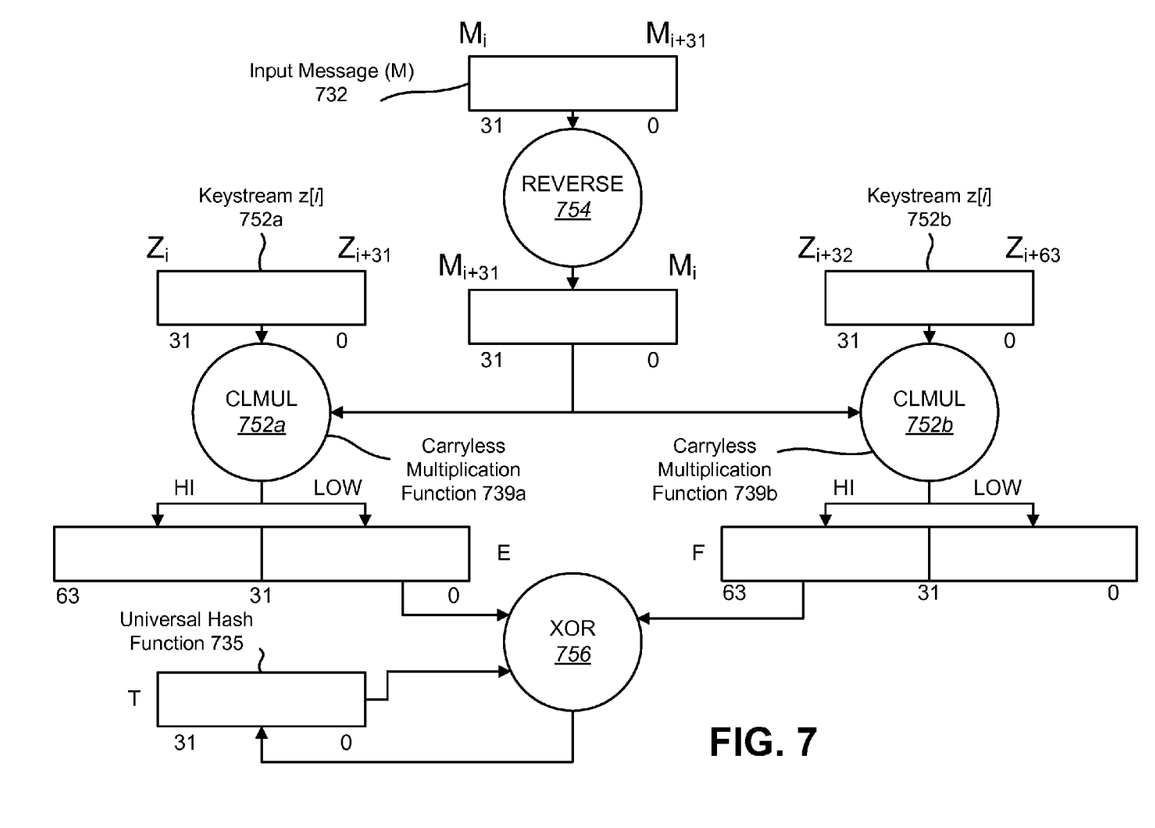
FIG. 7 is a block diagram illustrating the computation of the message authentication code (MAC) using carryless multiplication.

FIG. 7 is a block diagram illustrating the computation of the message authentication code (MAC) 220 using carryless multiplication. In one configuration, the message authentication code (MAC) 220 may be computed using a processor and/or memory on a wireless device 214. A 32-bit word of the input message (M) 732 $M_i \ldots M_{i+31}$ is received. As described in Equation (9), the bits in the input message (M) 732 may be reversed 754 to form $M_{i+32} \ldots M_i$. The bits in the input message (M) 732 may be reversed by mapping the words of the input message (M) 732 to their representation in the ring of polynomials.

The reversed message bits $M_{i+32} \ldots M_i$ may then be provided to a first carryless multiplication stage 752a and a second carryless multiplication stage 752b. Each of the carryless multiplication stages 752 may be carryless multiplication functions 739a-b. As described in Equation (10) above, 32 bits of the keystream 752a $Z_i \ldots Z_{i+31}$ are provided to the first carryless multiplication stage 752a to form the first 64-bit word E. Likewise, 32 bits of the keystream 752b $Z_{i+32} \ldots Z_{i+63}$ are provided to the second carryless multiplication stage 752b to form the second 64-bit word F (as described in Equation (11) above).

The first 64-bit word E may be separated into a highest 32-bit word and a lowest 32-bit word. Likewise, the second 64-bit word F may be separated into a highest 32-bit word and a lowest 32-bit word. The lowest 32-bit word of the first 64-bit word E may be denoted by the variable m. The highest 32-bit word of the second 64-bit word F may be denoted by the variable n. An exclusive OR (XOR) 756 may then be performed between m and n, as described above in Equation (12). The universal hash function T 735 is then computed according to Equation (13) above.

Figure 8:
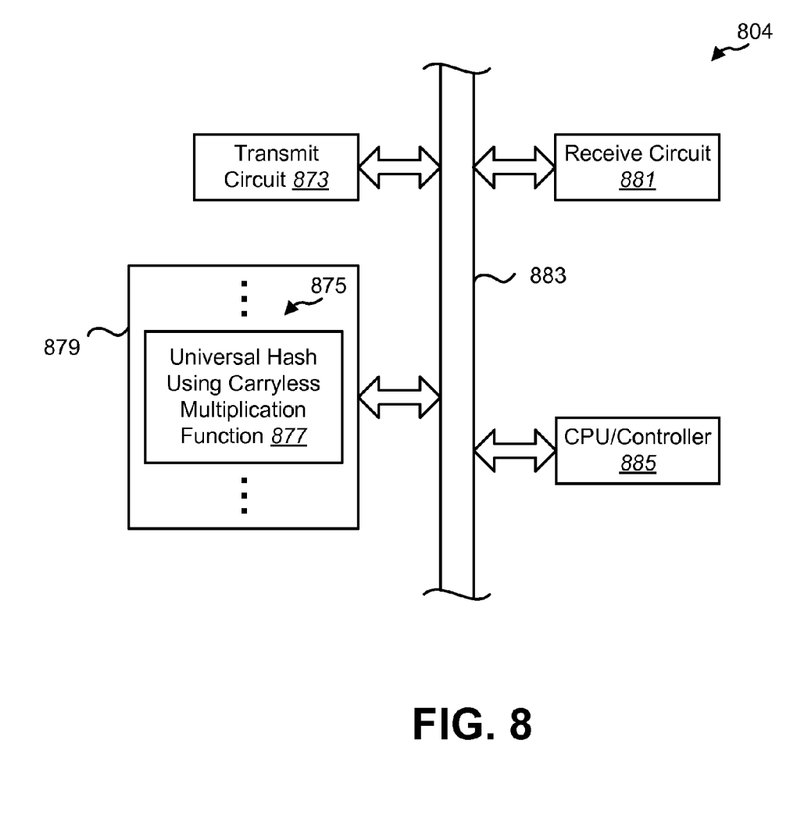
FIG. 8 illustrates certain components that may be included within a wireless communication device.

FIG. 8 shows part of a hardware implementation of a wireless communication device 804 for executing the schemes or processes as described above. The wireless communication device 804 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 8.

The wireless communication device 804 includes a central data bus 883 linking several circuits together. The circuits include a CPU (central processing unit) or a controller 885, a receive circuit 881, a transmit circuit 873, and a memory unit 879.

The receive circuit 881 and the transmit circuit 873 can be connected to an RF (radio frequency) circuit (which is not shown in the drawing). The receive circuit 881 processes and buffers received signals before sending the signals out to the data bus 883. On the other hand, the transmit circuit 873 processes and buffers the data from the data bus 883 before sending the data out of the wireless communication device 804. The CPU/controller 885 performs the function of data management of the data bus 883 and furthers the function of general data processing, including executing the instructional contents of the memory unit 879.

The memory unit 879 includes a set of modules and/or instructions generally signified by the reference numeral 875. In this embodiment, the modules/instructions include, among other things, a universal hash using carryless multiplication function 877 which carries out the schemes and processes as described above. The function 877 includes computer instructions or code for executing the process steps as shown and described in FIGS. 1-6. Specific instructions particular to an entity can be selectively implemented in the function 877.

In this embodiment, the memory unit 879 is a RAM (random access memory) circuit. The exemplary functions, such as the function 877, include one or more software routines, modules and/or data sets. The memory unit 879 can be tied to another memory circuit (not shown) which can be either volatile or nonvolatile. As an alternative, the memory unit 879 can be made of other circuit types, such as an EEPROM (electrically erasable programmable read only memory), an EPROM (electrical programmable read only memory), a ROM (read only memory), an ASIC (application specific integrated circuit), a magnetic disk, an optical disk, and others well known in the art.

Figure 9:
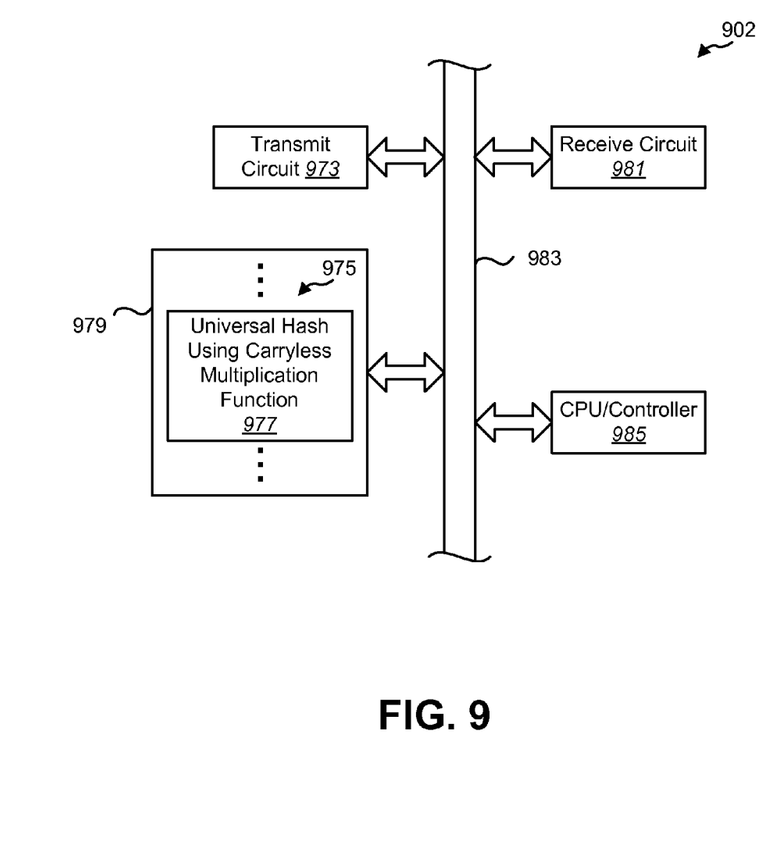
FIG. 9 illustrates certain components that may be included within a base station.

FIG. 9 shows part of a hardware implementation of a base station 902 for executing the schemes or processes as described above. The base station 902 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 9.

The base station 902 includes a central data bus 983 linking several circuits together. The circuits include a CPU (central processing unit) or a controller 985, a receive circuit 981, a transmit circuit 973, and a memory unit 979.

The receive circuit 981 and the transmit circuit 973 can be connected to an RF (radio frequency) circuit (which is not shown in the drawing). The receive circuit 981 processes and buffers received signals before sending the signals out to the data bus 983. On the other hand, the transmit circuit 973 processes and buffers the data from the data bus 983 before sending the data out of the base station 902. The CPU/controller 985 performs the function of data management of the data bus 983 and furthers the function of general data processing, including executing the instructional contents of the memory unit 979.

The memory unit 979 includes a set of modules and/or instructions generally signified by the reference numeral 975. In this embodiment, the modules/instructions include, among other things, a universal hash using carryless multiplication function 977 which carries out the schemes and processes as described above. The function 977 includes computer instructions or code for executing the process steps as shown and described in FIGS. 1-6. Specific instructions particular to an entity can be selectively implemented in the function 977.

In this embodiment, the memory unit 979 is a RAM (random access memory) circuit. The exemplary functions, such as the function 977, include one or more software routines, modules and/or data sets. The memory unit 979 can be tied to another memory circuit (not shown) which can be either volatile or nonvolatile. As an alternative, the memory unit 979 can be made of other circuit types, such as an EEPROM (electrically erasable programmable read only memory), an EPROM (electrical programmable read only memory), a ROM (read only memory), an ASIC (application specific integrated circuit), a magnetic disk, an optical disk, and others well known in the art.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

No claim element is to be construed under the provisions of 35 U.S.C. §112, sixth paragraph, unless the element is expressly recited using the phrase "means for" or, in the case of a method claim, the element is recited using the phrase "step for."

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 8 and FIG. 9.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, FIG. 4 and FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless device configured for authenticating a message, comprising:
   means for obtaining the message;
   means for generating a keystream; and
   means for computing, at the wireless device, a message authentication code using the keystream and a universal hash function wherein the universal hash function is computed using carryless multiplication, and wherein computing the universal hash function comprises:
   reversing a 32-bit word of the message;
   computing a first 64-bit word using carryless multiplication between the reversed 32-bit word of the message and a first 32-bit word of the keystream;
   computing a second 64-bit word using carryless multiplication between the reversed 32-bit word of the message and a second 32-bit word of the keystream;

performing an exclusive-OR operation between a lowest 32-bit word of the first 64-bit word and a highest 32-bit word of the second 64-bit word to obtain a first 32-bit variable; and performing an exclusive-OR operation between a second 32-bit variable and the first 32-bit variable.

2. The wireless device of claim 1, wherein the second 32-bit variable is initially set to 0.

3. The wireless device of claim 1, wherein the second 32-bit word of the keystream immediately follows the first 32-bit word of the keystream.

4. The wireless device of claim 1, wherein the universal hash function is computed using less than 32 machine instructions per 32 message bits.

5. The wireless device of claim 1, wherein the universal hash function is computed using 5 machine instructions per 32 message bits.

6. The wireless device of claim 1, wherein the message authentication code is computed using a 128-EIA3 algorithm.

7. The wireless device of claim 6, wherein the means for obtaining the message comprise means for generating a transmit message, and further comprising means for transmitting the transmit message and the message authentication code in a single message.

8. The wireless device of claim 6, wherein the means for obtaining the message comprise means for receiving a single message that comprises the message and the message authentication code, and further comprising:
   means for extracting a transmit message authentication code from the single message; and
   means for comparing the transmit message authentication code with the message authentication code to determine an authentication of the single message.

9. The wireless device of claim 1, wherein the keystream is generated using a stream cipher.

10. The wireless device of claim 1, wherein the wireless device is a wireless communication device.

11. The wireless device of claim 1, wherein the wireless device is a base station.

12. The wireless device of claim 1, wherein a wall clock execution time of carryless multiplication is independent of a hamming weight of operands.

13. An apparatus configured for authenticating a message, comprising:
   circuitry configured to obtain the message, to generate a keystream, and to compute a message authentication code using the keystream and a universal hash function, wherein the universal hash function is computed using carryless multiplication, and wherein computing the universal hash function comprises:
   reversing a 32-bit word of the message;
   computing a first 64-bit word using carryless multiplication between the reversed 32-bit word of the message and a first 32-bit word of the keystream;
   computing a second 64-bit word using carryless multiplication between the reversed 32-bit word of the message and a second 32-bit word of the keystream;
   performing an exclusive-OR operation between a lowest 32-bit word of the first 64-bit word and a highest 32-bit word of the second 64-bit word to obtain a first 32-bit variable; and
   performing an exclusive-OR operation between a second 32-bit variable and the first 32-bit variable.

14. The apparatus of claim 13, wherein the second 32-bit variable is initially set to 0.

15. The apparatus of claim 13, wherein the second 32-bit word of the keystream immediately follows the first 32-bit word of the keystream.

16. The apparatus of claim 13, wherein the universal hash function is computed using less than 32 machine instructions per 32 message bits.

17. The apparatus of claim 13, wherein the universal hash function is computed using 5 machine instructions per 32 message bits.

18. The apparatus of claim 13, wherein the message authentication code is computed using a 128-EIA3 algorithm.

19. The apparatus of claim 18, wherein the circuitry configured to obtain the message comprises circuitry configured to generate a transmit message, and further comprising circuitry configured to transmit the transmit message and the message authentication code in a single message.

20. The apparatus of claim 18, wherein the circuitry configured to obtain the message comprises circuitry configured to receive a single message that comprises the message and the message authentication code, and further comprising circuitry configured to extract a transmit message authentication code from the single message, and circuitry configured to compare the transmit message authentication code with the message authentication code to determine an authentication of the single message.

21. The apparatus of claim 13, wherein the keystream is generated using a stream cipher.

22. The apparatus of claim 13, wherein the apparatus is a wireless communication device.

23. The apparatus of claim 13, wherein the apparatus is a base station.

24. The apparatus of claim 13, wherein a wall clock execution time of carryless multiplication is independent of a hamming weight of operands.

25. A method for authenticating a message by a wireless device, comprising:
   obtaining the message;
   generating a keystream; and
   computing, at the wireless device, a message authentication code using the keystream and a universal hash function, wherein the universal hash function is computed using carryless multiplication, and wherein computing the universal hash function comprises:
   reversing a 32-bit word of the message;
   computing a first 64-bit word using carryless multiplication between the reversed 32-bit word of the message and a first 32-bit word of the keystream;
   computing a second 64-bit word using carryless multiplication between the reversed 32-bit word of the message and a second 32-bit word of the keystream;
   performing an exclusive-OR operation between a lowest 32-bit word of the first 64-bit word and a highest 32-bit word of the second 64-bit word to obtain a first 32-bit variable; and
   performing an exclusive-OR operation between a second 32-bit variable and the first 32-bit variable.

26. The method of claim 25, wherein the second 32-bit variable is initially set to 0.

27. The method of claim 25, wherein the second 32-bit word of the keystream immediately follows the first 32-bit word of the keystream.

28. The method of claim 25, wherein the universal hash function is computed using less than 32 machine instructions per 32 message bits.

29. The method of claim 25, wherein the universal hash function is computed using 5 machine instructions per 32 message bits.

30. The method of claim 25, wherein the message authentication code is computed using a 128-EIA3 algorithm.

31. The method of claim 30, wherein obtaining the message comprises generating a transmit message, and further comprising transmitting the transmit message and the message authentication code in a single message.

32. The method of claim 30, wherein obtaining the message comprises receiving a single message that comprises the message and the message authentication code, and further comprising:
   extracting a transmit message authentication code from the single message; and
   comparing the transmit message authentication code with the message authentication code to determine an authentication of the single message.

33. The method of claim 25, wherein the keystream is generated using a stream cipher.

34. The method of claim 25, wherein the wireless device is a wireless communication device.

35. The method of claim 25, wherein the wireless device is a base station.

36. The method of claim 25, wherein a wall clock execution time of carryless multiplication is independent of a hamming weight of operands.

37. A non-transitory computer-readable medium having instructions thereon, the instructions comprising:
   code for causing a wireless device to obtain a message;
   code for causing the wireless device to generate a keystream; and
   code for causing the wireless device to compute a message authentication code using the keystream and a universal hash function, wherein the universal hash function is computed using carryless multiplication, and wherein computing the universal hash function comprises:
   reversing a 32-bit word of the message;
   computing a first 64-bit word using carryless multiplication between the reversed 32-bit word of the message and a first 32-bit word of the keystream;
   computing a second 64-bit word using carryless multiplication between the reversed 32-bit word of the message and a second 32-bit word of the keystream;
   performing an exclusive-OR operation between a lowest 32-bit word of the first 64-bit word and a highest 32-bit word of the second 64-bit word to obtain a first 32-bit variable; and
   performing an exclusive-OR operation between a second 32-bit variable and the first 32-bit variable.

38. The non-transitory computer-readable medium of claim 37, wherein the second 32-bit variable is initially set to 0.

39. The non-transitory computer-readable medium of claim 37, wherein the second 32-bit word of the keystream immediately follows the first 32-bit word of the keystream.

* * * * *